United States Patent
Lee et al.

(10) Patent No.: US 11,482,113 B2
(45) Date of Patent: Oct. 25, 2022

(54) VEHICLE AND METHOD OF PLATOONING CONTROL THEREFOR

(71) Applicants: Hyundai Motor Company, Seoul (KR); Kia Motors Corporation, Seoul (KR)

(72) Inventors: Tae Ho Lee, Seoul (KR); In Ho Yoon, Gyeonggi-do (KR); Yeon Joo Cha, Gyeonggi-do (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 82 days.

(21) Appl. No.: 17/008,004

(22) Filed: Aug. 31, 2020

(65) Prior Publication Data

US 2021/0150909 A1    May 20, 2021

(30) Foreign Application Priority Data

Nov. 18, 2019 (KR) .......................... 10-2019-0147394

(51) Int. Cl.
*G08G 1/00* (2006.01)
*H04L 12/14* (2006.01)
*H04W 4/24* (2018.01)
*H04W 4/46* (2018.01)
*H04W 28/20* (2009.01)
*H04W 84/20* (2009.01)

(52) U.S. Cl.
CPC .............. *G08G 1/22* (2013.01); *H04L 12/145* (2013.01); *H04L 12/1485* (2013.01); *H04W 4/24* (2013.01); *H04W 4/46* (2018.02); *H04W 28/20* (2013.01); *H04W 84/20* (2013.01)

(58) Field of Classification Search
CPC ..... G08G 1/22; H04L 12/145; H04L 12/1485; H04M 15/765; H04M 15/80; H04M 15/8044; H04M 15/8055; H04M 15/8083; H04W 28/20; H04W 4/24; H04W 4/40; H04W 4/46; H04W 84/20
See application file for complete search history.

(56) References Cited

U.S. PATENT DOCUMENTS

| | | | |
|---|---|---|---|
| 9,037,389 B2 * | 5/2015 | You ........................ | G08G 1/22 701/117 |
| 10,703,262 B1 * | 7/2020 | Hong ..................... | H04W 4/40 |
| 10,841,762 B2 * | 11/2020 | Henry .................. | G05D 1/0027 |
| 2014/0316671 A1 * | 10/2014 | Okamoto ................ | G08G 1/22 701/96 |

(Continued)

*Primary Examiner* — Liton Miah
(74) *Attorney, Agent, or Firm* — Fox Rothschild LLP

(57) ABSTRACT

A vehicle and method of platooning control therefor are provided to achieve optimum communication charge efficiency while a plurality of vehicles perform platooning. A data communication method of a platooning vehicle includes starting platooning by a plurality of vehicles and sharing data charge rate information through a first protocol for vehicle-to-vehicle communication (V2V) by the plurality of vehicles. A first master vehicle and at least one slave vehicle are determined based on the shared data charge rate information. An access point (AP) is then activated according to a second protocol for short distance communication by the first master vehicle and an AP of the master vehicle is accessed and data communication is performed by the at least one slave vehicle.

17 Claims, 7 Drawing Sheets

(56) References Cited

U.S. PATENT DOCUMENTS

| | | | |
|---|---|---|---|
| 2018/0082591 A1* | 3/2018 | Pandy | B60W 10/18 |
| 2019/0174011 A1* | 6/2019 | Jabara | H04M 15/8214 |
| 2019/0258268 A1* | 8/2019 | Macneille | G05D 1/0287 |
| 2021/0166567 A1* | 6/2021 | Cuevas Ramirez | G08G 1/22 |

* cited by examiner

VEHICLE AND METHOD OF PLATOONING CONTROL THEREFOR

CROSS-REFERENCE TO RELATED APPLICATION(S)

This application claims the benefit of Korean Patent Application No. 10-2019-0147394, filed on Nov. 18, 2019 which is hereby incorporated by reference as if fully set forth herein.

BACKGROUND

Field of the Disclosure

The present disclosure relates to a vehicle and method of platooning control therefor, and more particularly, to a vehicle and method of platooning control therefor achieving optimum communication charge efficiency while a plurality of vehicles performs platooning.

Discussion of the Related Art

A conventional vehicle generally communicates with only a preset limited external object such as a telematics center, but recently, as communication technology has been further integrated into a vehicle, the vehicle is capable of communicating with diversified objects while traveling. Such a vehicle is referred to as a connected car in that the vehicle is capable of being connected to various objects, and network technology is referred to as vehicle to everything (V2X) used in the connected car.

As vehicle to everything (V2X) has been realized as a type of the V2X technology, platooning technology of forming a V2X network by a plurality of vehicles and allowing the vehicles to travel while maintaining an interval to other vehicles has also been developed. Platooning is technology of rapidly transmitting and receiving various pieces of information such as a direction, a signal, a position, or a speed through network connection and multiply applying already commercially available autonomous driving assist technologies such as autonomous emergency braking, lane keeping assist, and reactive vehicle control.

However, the currently introduced platooning technology merely maintains a platooning line mainly through 1:1 based V2V communication but uses respective data communication modules of separate vehicles for communication, for example, multimedia streaming or the Internet based data communication with a different object that is not a vehicle.

As a result, a plurality of vehicles that have the same destination and perform platooning together for a predetermined distance or greater use data communication based on respective charge rates even while platooning, and accordingly, when there is a vehicle that has a relatively low communication charge rate or of which a residual data capacity is insufficient due to the charge rate, the vehicle is not capable of using a data charge rate of another vehicle.

SUMMARY

Accordingly, the present disclosure provides a vehicle and method of platooning control for the same for achieving optimum communication charge efficiency while a plurality of vehicles performs platooning. The technical problems solved by the exemplary embodiments are not limited to the above technical problems and other technical problems which are not described herein will become apparent to those skilled in the art from the following description.

To achieve these objects and other advantages and in accordance with the purpose of the invention, as embodied and broadly described herein, a data communication method of a platooning vehicle may include starting platooning by a plurality of vehicles, sharing data charge rate information through a first protocol for vehicle-to-vehicle communication (V2V) by the plurality of vehicles, determining a first master vehicle and at least one slave vehicle based on the shared data charge rate information, activating an access point (AP) according to a second protocol for short distance communication by the first master vehicle, and accessing an AP of the master vehicle and performing data communication by the at least one slave vehicle.

In another aspect of the present disclosure, a vehicle may include a communicator having a first communication module configured to support a first protocol for vehicle-to-vehicle communication (V2V), and a second communication module configured to support a second protocol for short distance communication, a first controller configured to execute platooning based on information acquired through the at least one communicator, and a second controller when the platooning with at least one another vehicle is started, configured to share data charge rate information with the at least one another vehicle through the first communication module, determine whether a vehicle is a first master vehicle or a slave vehicle based on the shared data charge rate information, and activate an access point (AP) that the at least one another vehicle determined as the slave vehicle is capable of accessing, through the second communication module, when the vehicle is determined as the first master vehicle.

BRIEF DESCRIPTION OF THE DRAWINGS

The accompanying drawings, which are included to provide a further understanding of the disclosure and are incorporated in and constitute a part of this application, illustrate exemplary embodiment(s) of the disclosure and together with the description serve to explain the principle of the disclosure. In the drawings.

DETAILED DESCRIPTION OF THE INVENTION

Figure 1:
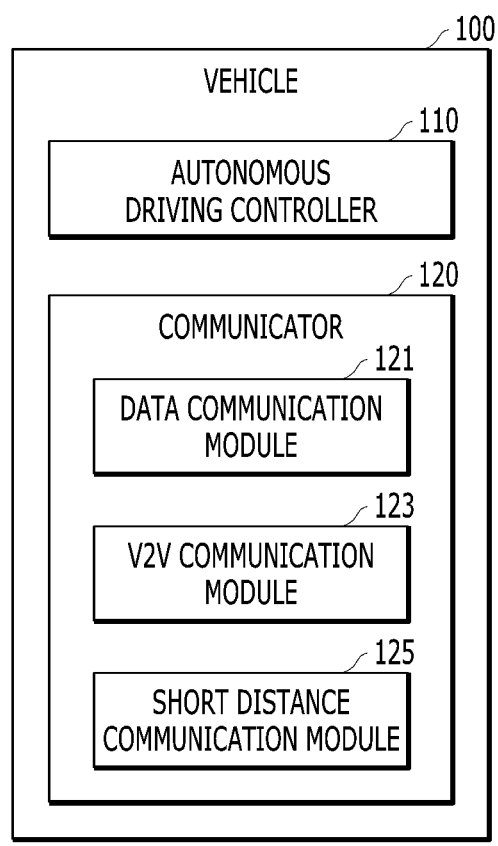
FIG. 1 is a block diagram showing an example of a configuration of a vehicle applied to a platooning control method according to exemplary embodiments of the present disclosure.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, combustion, plug-in hybrid electric vehicles, hydrogen-powered vehicles and other alternative fuel vehicles (e.g. fuels derived from resources other than petroleum).

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor and is specifically programmed to execute the processes described herein. The memory is configured to store the modules and the processor is specifically configured to execute said modules to perform one or more processes which are described further below.

Furthermore, control logic of the present invention may be embodied as non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Exemplary embodiments of the present disclosure are described in detail so as for those of ordinary skill in the art to easily implement with reference to the accompanying drawings. However, the present disclosure may be implemented in various different forms and is not limited to these embodiments. To clearly describe the present disclosure, a part without concerning to the description is omitted in the drawings, and like reference numerals in the specification denote like elements. The same reference numbers will be used throughout the drawings and the specification to refer to the same parts.

FIG. 1 is a block diagram showing an example of a configuration of a vehicle applied to a platooning control method according to exemplary embodiments of the present disclosure. Referring to FIG. 1, a vehicle 100 applicable to the exemplary embodiments may include an autonomous driving controller 110 and a communicator 120. Needless to say, only components related to the present exemplary embodiment are illustrated in FIG. 1, and it would be obvious to one of ordinary skill in the art that an actual vehicle has further components.

For example, the autonomous driving controller 110 may be configured to acquire required information from a surrounding vehicle or an infrastructure via the communicator 120 to perform platooning but may be configured to acquire information required for driving using various advanced driver assistance systems (ADASs) or sensors (not shown). The autonomous driving controller 110 may be configured to perform computation required to determine a master vehicle and a slave vehicle that will be described below and identify and determine access point activation/access, resetting of the master vehicle, or the like, and may be configured to operate the communicator 120 based thereon. In some exemplary embodiments, such computation and control functions required for identification/determination may also be performed by a separator controller (e.g., an audio/video/navigation system) that is not the autonomous driving controller 110.

The communicator 120 may include a data communication module 121, a vehicle-to-vehicle (V2V) communication module 123, and a short distance communication module 125. Similarly to data communication of a smartphone, or the like, the data communication module 121 may be configured to communicate with various external objects such as a web server, a data server, or a streaming server via a cellular base station based on a cellular communication protocol such as 4G/5G.

The V2V communication module 123 may be configured to exchange data with a surrounding vehicle using a predetermined V2V communication protocol. For example, information of the surrounding vehicle required for platooning may be acquired via the V2V communication module 123. The V2V communication protocol may be IEEE 802.11p-based dedicated short-range communications (DSRC)/wireless access in vehicle environment (WAVE), cooperative intelligent transportation system (C-ITS), a cellular based C-V2X, or the like, but the present disclosure is not limited thereto.

The short distance communication module 125 may be configured to provide an access point (AP) based on data communication access of the data communication module 121 or access an access point (AP) provided by the short distance communication module 125 of another vehicle and may perform data communication. For example, the short distance communication module 125 may support a Wi-Fi protocol, but the present disclosure is not limited thereto.

Vehicles stated in the following description are assumed to have the components described above with reference to FIG. 1 unless there is no different disclosure. As described above, even if a plurality of vehicles that perform platooning together for a predetermined distance or greater, for example, having the same destination is performing platooning, the vehicles use data communication based on respective charge rates, and thus, even if there is a vehicle that has a relatively low communication charge rate or of which a residual data capacity is insufficient due to its charge rate, the vehicle is not capable of using a data charge rate of another vehicle.

Therefore, according to proposal of an exemplary embodiment of the present disclosure, a master vehicle may be set between platooning vehicles, and the master vehicle may be configured to activate data communication based on its charge rate and provide an access point function to another vehicle that participates in platooning.

Figure 2:
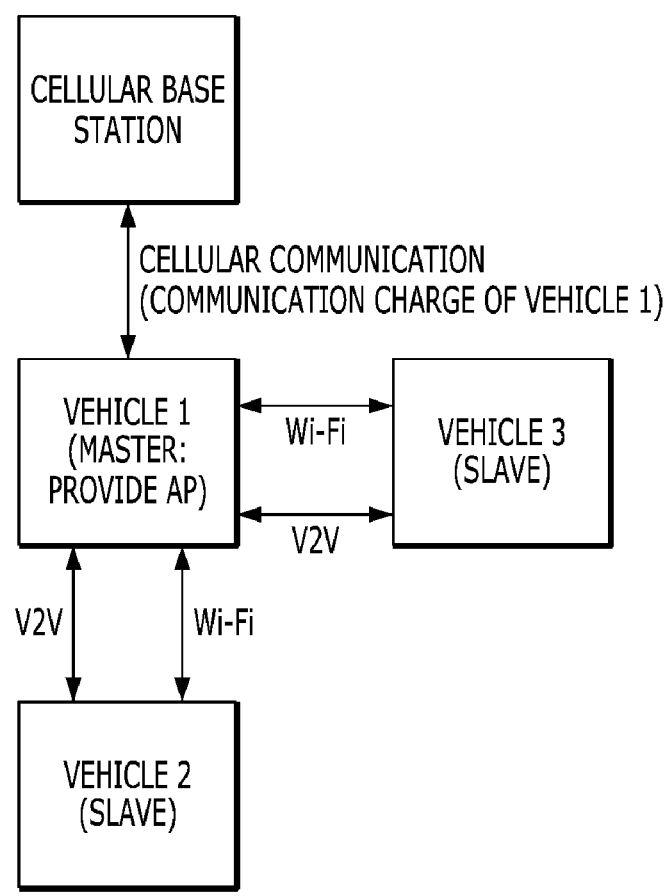
FIG. 2 is a diagram for explaining a concept of a communication type according to an exemplary embodiment of the present disclosure.

FIG. 2 is a diagram for explaining a concept of a communication type according to an exemplary embodiment of the present disclosure. In the following description including FIG. 2, for convenience of description, a short distance communication is assumed to be Wi-Fi and an access point (AP) function is assumed to be a Wi-Fi hotspot function.

FIG. 2 illustrates a situation in which vehicles 1 to 3 (e.g., a first vehicle, a second vehicle, and a third vehicle) are performing platooning. In particular, vehicle 1 or the first vehicle may be selected as a master vehicle and may be configured to access a cellular base station via the data communication module 121 thereof and activate a Wi-Fi hotspot based on cellular data communication. The other platooning vehicles except for the master vehicle, that is, vehicles 2 and 3 (e.g., the second and third vehicles) may be set as slave vehicles and may be configured to access an access point (AP) provided by the master vehicle via short distance communication to save or reduce a data charge. Thus, when the master vehicle is selected based on a data charge rate, efficiency of a data charge for vehicles that participate in platooning may be realized. Needless to say, when a residual data capacity of the master vehicle is insufficient or a vehicle having a more inexpensive charge rate joins platooning, the master vehicle may also be changed to another vehicle.

Figure 3:
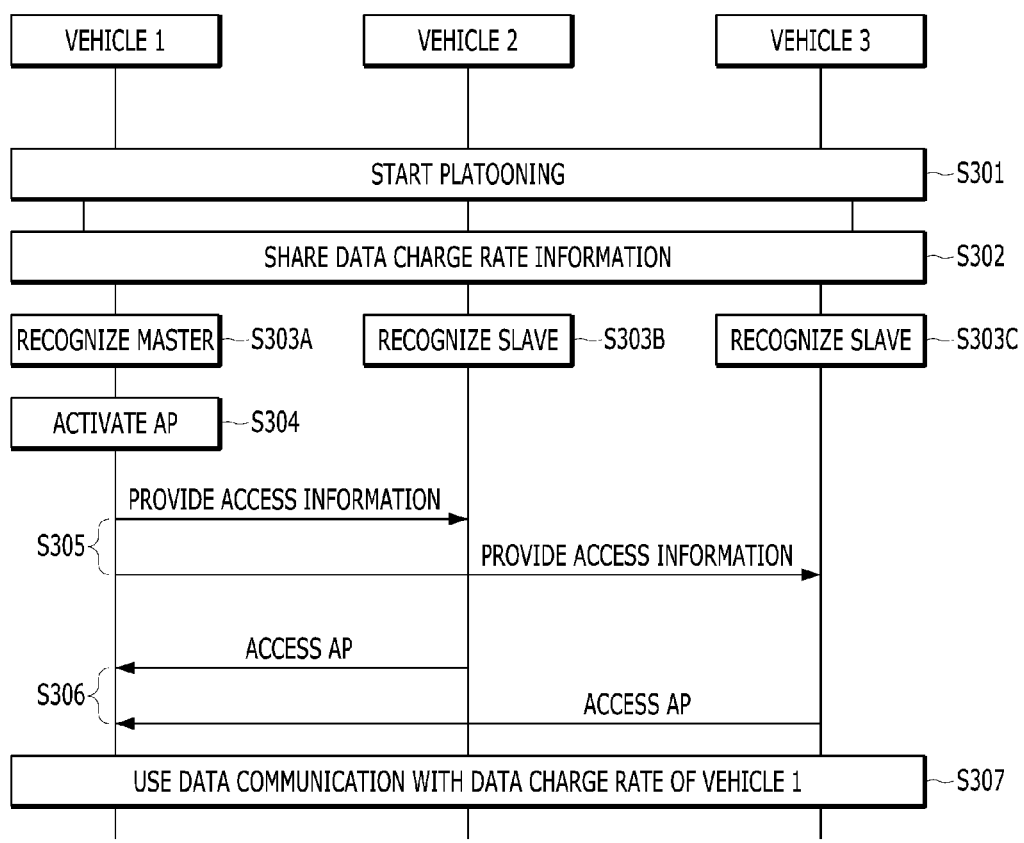
FIG. 3 is a diagram showing an example of a procedure of a data communication method through selection of a master vehicle during platooning according to an exemplary embodiment of the present disclosure.

FIG. 3 is a diagram showing an example of a procedure of a data communication method through selection of a master vehicle during platooning according to an exemplary embodiment of the present disclosure. In FIG. 3, it is assumed that three vehicles of vehicles 1 to 3 participate in platooning and vehicle 1 (e.g., the first vehicle) has the most inexpensive data charge rate. Referring to FIG. 3, first, platooning may be started through a platooning start procedure based on a predetermined V2V protocol (S301). The present exemplary embodiment is not limited by the platooning start procedure, and thus, any manner of platooning procedure may be applied.

Platooning may be started but a master vehicle that is supposed to provide an access point is not selected yet, and thus, information regarding data charge rates of respective vehicles that participate in platooning via V2V communication may be shared (S302). When sharing of information regarding the data charge rates is completed, each vehicle may be configured to recognize whether the vehicle is a master or a slave based on the shared charge rate information (S303A, S303B, and S303C). For example, a vehicle having the most inexpensive charge rate may be configured to recognize that the corresponding vehicle is a master and other vehicles may be configured to recognize that they are slaves. When the most inexpensive charge rate is used by a plurality of vehicles, a vehicle having a higher residual data capacity may also be a master.

Vehicle 1 (e.g., the first vehicle) recognized as a master may be configured to activate an access point (AP) function (S304) and provide information regarding access to a slave vehicle (S305). In particular, the access information may be information required for vehicle 1 to access the activated AP and may include at least one of a Wi-Fi MAC address, an access password, or a service set identifier (SSID) in the case of Wi-Fi hotspot. The access information may be transmitted via V2V communication. The slave vehicles may be configured to access the AP of the master vehicle (i.e., vehicle 1) based on the received access information (S306). Thus, vehicles that participate in platooning may use data communication using a data charge rate of vehicle 1.

The access point (AP) may have coverage in a predetermined range, and in this regard, connection of the slave vehicle with the AP of the master vehicle may be temporarily terminated based on a traffic situation (e.g., a high-speed traveling situation with an increased safe distance) or a traveling direction (e.g., left turn or right turn) during platooning. In particular, among slave vehicles that are disconnected from the previous master vehicle, a master may be re-determined and a data communication function may be maintained, which will be described with reference to FIG. 4.

Figure 4:
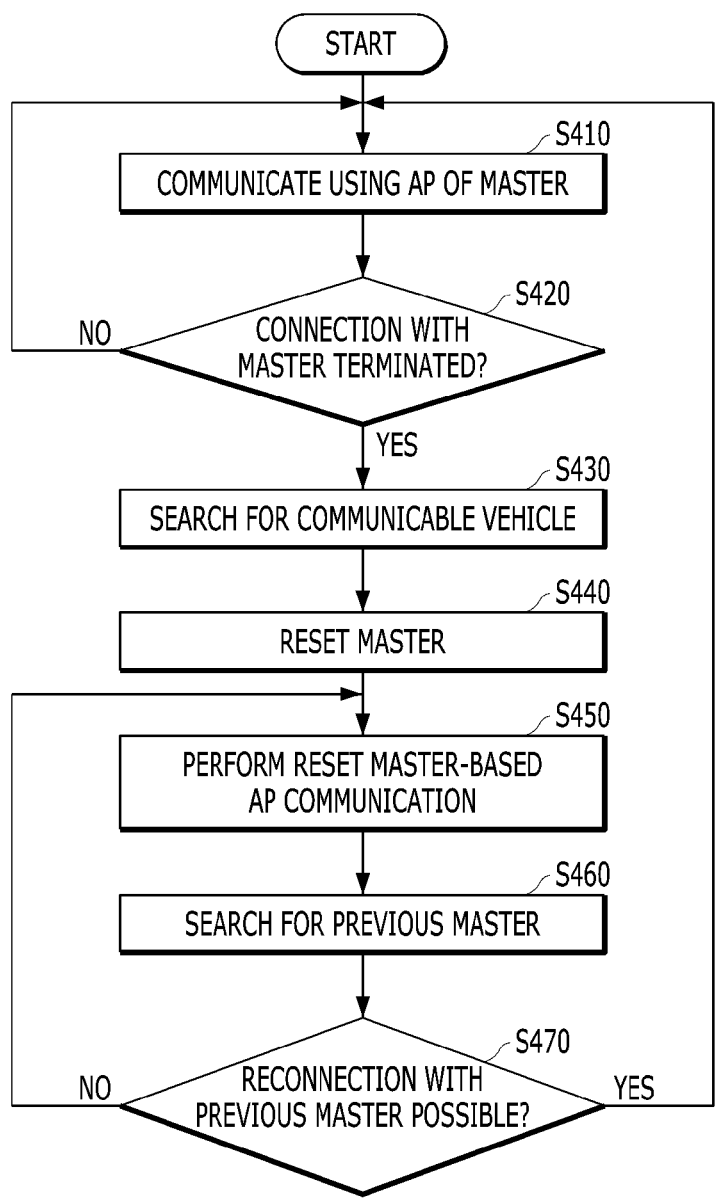
FIG. 4 is a flowchart showing an example of a communication procedure as connection with a master vehicle is terminated according to an exemplary embodiment of the present disclosure.

FIG. 4 is a flowchart showing an example of a communication procedure as connection with a master vehicle is terminated according to an exemplary embodiment of the present disclosure. Referring to FIG. 4, vehicles that participate in platooning may be configured to access an AP of a master and perform data communication based on short distance communication through the procedure described above with reference to FIG. 3 (S410).

When connection of at least one of slave vehicles with the master vehicle is terminated due to departure from a platooning line based on a traveling situation, that is, when AP access is disconnected (YES of S420), each slave vehicle may be configured to search for a vehicle that is capable of communicating among vehicles that participate in previous platooning (S430) and may be configured to reset a master vehicle similarly to the procedure described above with reference to FIG. 3 (S440).

Slave vehicles that are disconnected from the previous master vehicle may be configured to perform data communication through an AP of the reset master vehicle (S450) and monitor whether the slave vehicles are capable of accessing the AP of the previous master with a predetermined period or in real time (S460). Whether the slave vehicles are capable of accessing the AP of the previous master may be monitored by determining a distance with the previous master via V2V communication, but the present disclosure is not limited thereto. For example, a vehicle maintained in a slave level may be configured to search for an AP of the previous master via Wi-Fi communication even in a situation the vehicle accesses the reset AP. Then, when the vehicle is capable of accessing the AP of the previous master vehicle, for example, a platooning line may be recovered (YES of S470), previous slave vehicles including the reset master may be configured to re-access the AP of the previous master.

Figure 5:
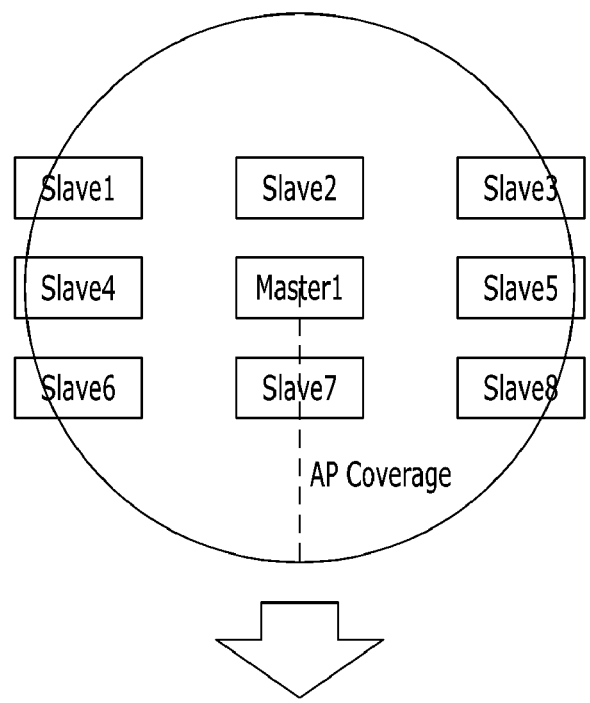
FIG. 5 is a diagram showing an example of a situation in which a master is reset in a situation in which a vehicle departs from a platooning line according to an exemplary embodiment of the present disclosure.
Figure 5:
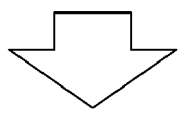
Figure 5:
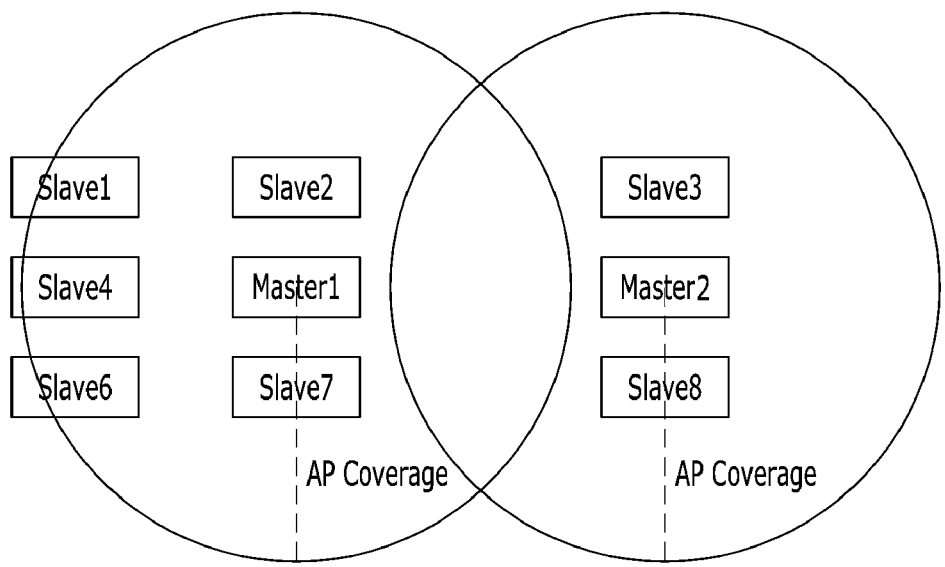

A detailed example of the procedure described with reference to FIG. 4 will be described with reference to FIG. 5. FIG. 5 is a diagram showing an example of a situation in which a master is reset in a situation in which a vehicle departs from a platooning line according to an exemplary embodiment of the present disclosure.

Referring to an upper part of FIG. 5, 8 slave vehicles (Slaves 1 to 8) may be configured to perform data communication through an AP of a master vehicle while platooning with a master vehicle (Master 1). In this situation, when right three slave vehicles (Slaves 3, 5, and 8) depart from AP coverage of a master vehicle (Master 1), a slave vehicle (Slave 5) may be set as a new master vehicle (Master 2) and may provide be configured to an AP function to slave vehicles Slaves 3 and 8, as shown in a lower part of FIG. 5.

Figure 6:
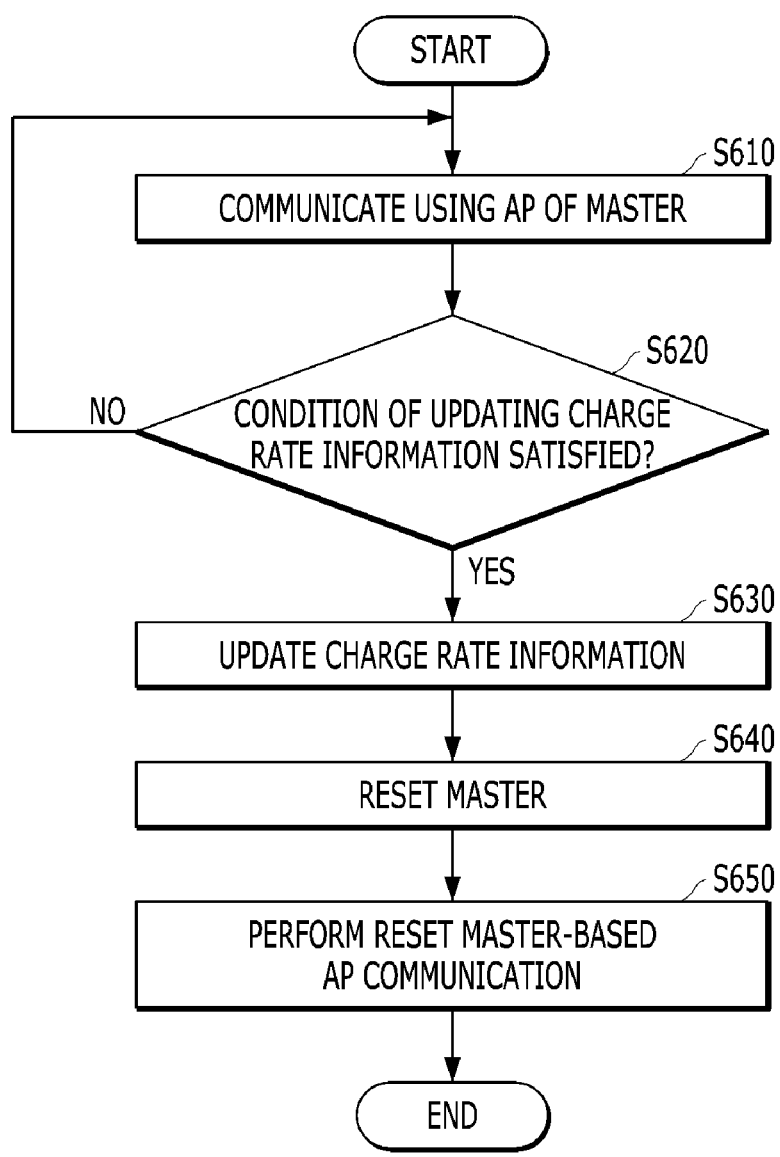
FIG. 6 is a flowchart showing an example of a procedure of changing a master according to an exemplary embodiment of the present disclosure.

Hereinafter, a procedure of changing a master will be described with reference to FIGS. 6 and 7. FIG. 6 is a flowchart showing an example of a procedure of changing a master according to an exemplary embodiment of the present disclosure. Referring to FIG. 6, vehicles that participate in platooning may be configured to determine a master vehicle and perform data communication using an AP of the master through the procedure described with reference to FIG. 3 (S610).

During this, when a preset condition of updating charge rate information is satisfied (YES of S620), the charge rate information may be updated (S630) and a master may be reset based on the updated charge rate information (S640). In particular, the condition of updating the charge rate information may include the case in which a preset updating period elapses, the case in which a residual data capacity of the master vehicle is exhausted or reaches a predetermined amount, and the case in which a new vehicle participates in platooning, but the present disclosure is not limited thereto.

The charge rate information may be updated (S630) by returning charge rate information of slaves vehicles therefrom according to a request of the master vehicle and reporting charge rate information of slave vehicles to the master vehicle without a request of the master according to a condition (e.g., a timer method managed by each slave vehicle). The charge rate information updating operation S630 and the master resetting operation S640 may correspond to operations S302 and S303A to S303C of FIG. 3, and thus, a repeated description thereof will be omitted. When a master is reset, vehicles that participate in platooning may be configured to perform data communication through an AP of the reset master (S650).

A detailed example of the procedure described with reference to FIG. 6 will be described with reference to FIG. 7. FIG. 7 is a diagram showing an example of a situation in which a master is reset according to an exemplary embodiment of the present disclosure.

Figure 7:
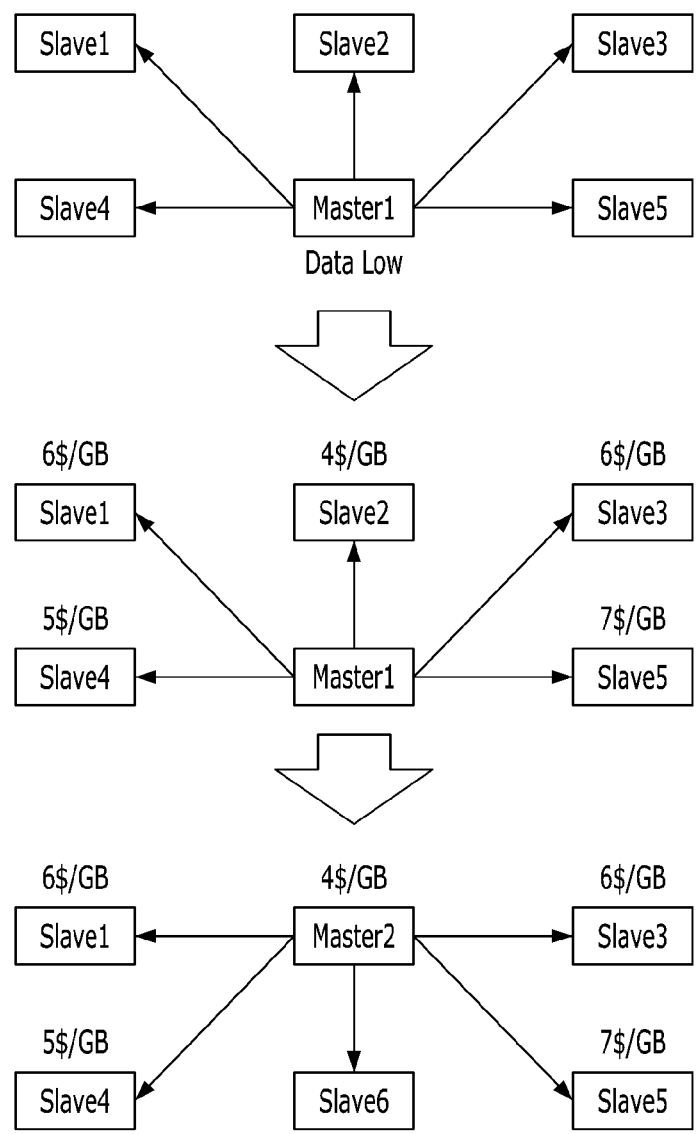
FIG. 7 is a diagram showing an example of a situation in which a master is reset according to an exemplary embodiment of the present disclosure.

An upper part of FIG. 7 illustrates a situation in which five slave vehicles (Slaves 1 to 5) access an AP provided by one master vehicle (Master 1). In particular, when a residual data capacity of a master vehicle is reduced to a predetermined level or less, the master vehicle may be configured to generate a request to slave vehicles for charge rate information as an intermediate part of FIG. 7. Thus, a slave vehicle (Slave 2) using the most inexpensive charge rate may be reset as a master vehicle (Master 2), and the previous master may be changed to a slave vehicle (Slave 6) and may be configured to access an AP of the reset master vehicle (Master 2) as shown in a lower end of FIG. 7.

The vehicle related to at least one exemplary embodiment of the present disclosure as configured above may share data telecommunication fee information with a vehicle that participates in platooning, and a vehicle using the most inexpensive communication charge rate may provide an access point (AP) function to another vehicle according to a predetermined short distance communication protocol, and thus, a plurality of vehicles may achieve optimum communication fee efficiency while platooning.

It will be appreciated by persons skilled in the art that that the effects that could be achieved with the present disclosure are not limited to what has been particularly described hereinabove and other advantages of the present disclosure will be more clearly understood from the detailed description.

The aforementioned present disclosure can also be embodied as computer readable code stored on a non-transitory computer readable recording medium. The non-transitory computer readable recording medium is any data storage device configured to store data which can thereafter be read by a computer. Examples of the non-transitory computer readable recording medium include a hard disk drive (HDD), a solid state drive (SSD), a silicon disc drive (SDD), read-only memory (ROM), random-access memory (RAM), CD-ROM, magnetic tapes, floppy disks, optical data storage devices, etc.

It will be apparent to those skilled in the art that various modifications and variations can be made in the present disclosure without departing from the spirit or scope of the inventions. Thus, it is intended that the present disclosure cover the modifications and variations of this invention provided they come within the scope of the appended claims and their equivalents.

What is claimed is:

1. A data communication method of a platooning vehicle, comprising:
    starting platooning by a plurality of vehicles;
    sharing data charge rate information through a first protocol for vehicle-to-vehicle communication (V2V) by the plurality of vehicles;
    determining a first master vehicle and at least one slave vehicle among the plurality of vehicles based on the shared data charge rate information;
    activating an access point (AP) according to a second protocol for short distance communication by the first master vehicle; and
    accessing an AP of the master vehicle and performing data communication by the at least one slave vehicle,
    wherein the determining of the first master vehicle includes determining a vehicle using a most inexpensive data charge rate among the plurality of vehicles as the first master vehicle.

2. The method of claim 1, wherein the first master vehicle is connected to a base station and is configured to activate the AP based on a third protocol for wireless data communication.

3. The method of claim 2, wherein the AP according to the second protocol includes a Wi-Fi hotspot.

4. The method of claim 1, further comprising:
    when connection with an AP of the first master vehicle is terminated in the at least one slave vehicle, setting a second master vehicle among the slave vehicles, connection of which is terminated.

5. The method of claim 4, further comprising:
    after setting the second master vehicle among the slave vehicles, connection of which is terminated, re-accessing the AP of the first master vehicle when it is possible to re-access the AP of the first master vehicle.

6. The method of claim 1, further comprising:
    when the first master vehicle is determined and then a preset condition of updating charge rate information is satisfied, updating the charge rate information between the plurality of vehicles.

7. The method of claim 6, further comprising determining whether the first master vehicle is changed according to the updated charge rate information.

8. The method of claim 6, the condition of updating charge rate information is satisfied includes at least one of a new vehicle joining the platooning, a residual data capacity of the first master vehicle being equal to or less than a predetermined level, and a predetermined period elapsing.

9. A non-transitory computer-readable recording medium having recorded thereon a program for executing the method of claim 1.

10. A vehicle, comprising:
    a communicator including a first communication module configured to support a first protocol for vehicle-to-vehicle communication (V2V), and a second communication module configured to support a second protocol for short distance communication;

a first controller configured to execute platooning based on information acquired through the at least one communicator; and a second controller when the platooning with at least one another vehicle is started, configured to:

share data charge rate information with the at least one another vehicle through the first communication module;

determine whether a vehicle is a first master vehicle or a slave vehicle based on the shared data charge rate information; and activate an access point (AP) that the at least one another vehicle determined as the slave vehicle is capable of accessing, through the second communication module, in response to determining the vehicle as the first master vehicle;

wherein the second controller is configured to determine the vehicle as the first master vehicle when a charge rate of the vehicle is a most inexpensive charge rate among the shared charge rate information, and determine the vehicle as the slave vehicle when a charge rate of the at least one another vehicle is most inexpensive.

11. The vehicle of claim 10, wherein the communicator further includes:

a third communication module configured to support a third protocol for wireless data communication;

wherein, in response to determining the vehicle as the first master vehicle, and wherein the second controller is connected to a base station through the third communication module and is configured to activate the AP.

12. The vehicle of claim 11, wherein an AP according to the second protocol includes a Wi-Fi hotspot.

13. The vehicle of claim 10, wherein, in response to determining the vehicle as the slave vehicle, the second controller is configured to access an AP of the first master vehicle and perform data communication; and wherein, when connection with the AP is terminated, the second controller is configured to determine whether a vehicle is a second master vehicle or a slave vehicle with respect to the second master vehicle.

14. The vehicle of claim 13, wherein, in response to determining the vehicle as the slave vehicle with respect to the second master vehicle, the second controller is configured to access an AP of the second master vehicle and then access an AP of the first master vehicle when it is possible to re-access the AP of the first master vehicle.

15. The vehicle of claim 10, wherein, in response to determining the vehicle as the master vehicle, the second controller is configured to update the at least one another vehicle and charge rate information when a preset condition of updating the charge rate information is satisfied.

16. The vehicle of claim 15, wherein the second controller is configured to determine whether the first master vehicle is changed based on the updated charge rate information.

17. The vehicle of claim 15, the condition of updating charge rate information is satisfied includes at least one a new vehicle joining the platooning, a residual data capacity of the first master vehicle being equal to or less than a predetermined level, and a predetermined period elapsing.

* * * * *